United States Patent [19]

Schlosser et al.

[11] Patent Number: 4,860,724

[45] Date of Patent: Aug. 29, 1989

[54] GAS BURNER ASSEMBLY

[75] Inventors: Erich J. Schlosser, Barrington; Andrzej Leja, Palatine, both of Ill.

[73] Assignee: Weber-Stephen Products Co., Palatine, Ill.

[21] Appl. No.: 231,499

[22] Filed: Aug. 12, 1988

[51] Int. Cl.⁴ ............................................. F24C 5/20
[52] U.S. Cl. ...................................... 126/38; 126/9 R
[58] Field of Search ............ 126/9 R, 9 A, 9 B, 25 R, 126/38, 40, 41 R, 39 R, 39 B, 44, 211, 215

[56] References Cited

U.S. PATENT DOCUMENTS

| | | | |
|---|---|---|---|
| 1,714,264 | 5/1929 | Goldberg et al. | 126/38 |
| 3,753,431 | 8/1973 | Koziol | 126/38 |
| 3,903,867 | 9/1975 | Vestergaard | 126/38 |
| 4,426,990 | 1/1984 | Shepherd | 126/38 |
| 4,508,095 | 4/1985 | Bloechel | 126/38 |

Primary Examiner—James C. Yeung
Attorney, Agent, or Firm—Wallenstein Wagner & Hattis, Ltd.

[57] ABSTRACT

A burner assembly for an outdoor cooking device, and a method of assembly thereof, requiring no tools or fasteners are disclosed.

16 Claims, 1 Drawing Sheet

GAS BURNER ASSEMBLY

TECHNICAL FIELD

Applicant's invention relates to outdoor gas cooking devices and, more particularly, to a burner assembly therefore and a method of assembly thereof.

BACKGROUND PRIOR ART

Outdoor gas cooking devices, or grills, are quite popular, especially because they provide the flavor and satisfaction of cooking over a traditional charcoal grill while eliminating the inconvenience and mess associated with starting and maintaining a charcoal fire.

Such gas grills include complex burner assemblies, however, which are relatively difficult to assemble and require the use of tools, thereby making them relatively expensive to manufacture.

SUMMARY OF THE INVENTION

It is an object of the invention to provide a burner assembly for an outdoor gas grill which can easily be assembled without tools or fasteners.

In accordance with one aspect of the invention, the burner assembly comprises a receptacle including a base surface and opposing, upwardly directed first and second walls. The base surface includes a base slot, and the first and second walls have respective first and second wall slots. The burner assembly further comprises a gas burner, a gas valve, a flexible tube for transmitting gas from a gas supply to the gas valve, a rigid tube for transmitting gas from the gas valve to the burner, a first, resilient bracket secured to the burner, the first bracket extending downwardly from the burner and terminating at a first bracket tab, and a second bracket secured to the valve, the second bracket having generally horizontal first and second end tabs, wherein the first bracket tab is disposed in the base slot and the first and second end tabs are disposed in respective ones of the first and second wall slots. Dimensions among the base slot and the first and second wall slots relative to dimensions among the first bracket tab and the first and second end tabs maintain the first and second brackets under compression when the tabs are disposed in their respective slots.

In accordance with another aspect of the invention, a method of assembling the burner assembly comprises the steps of providing a receptacle having a base surface and opposing first and second walls, the base surface including a base slot and the first and second walls having respective first and second wall slots, providing a gas burner and a gas valve, and providing a gas pipe coupling the gas valve to the burner. The method further comprises the steps of securing a first bracket to the burner, the first bracket extending downwardly from the burner and terminating at a first bracket tab, securing a second bracket to the valve, the second bracket having generally horizontal first and second end tabs, disposing the first bracket tab in the base slot, and disposing the first and second end tabs in respective ones of the first and second wall slots.

By utilizing resilient first and second brackets, and properly making the dimensions among the tabs relative to the dimensions among the slots, the brackets are maintained under pressure to securely maintain the tabs in their respective slots.

Other features and advantages of the invention will be apparent from the following specification taken in conjunction with the accompanying drawings.

DETAILED DESCRIPTION

Figure 1:
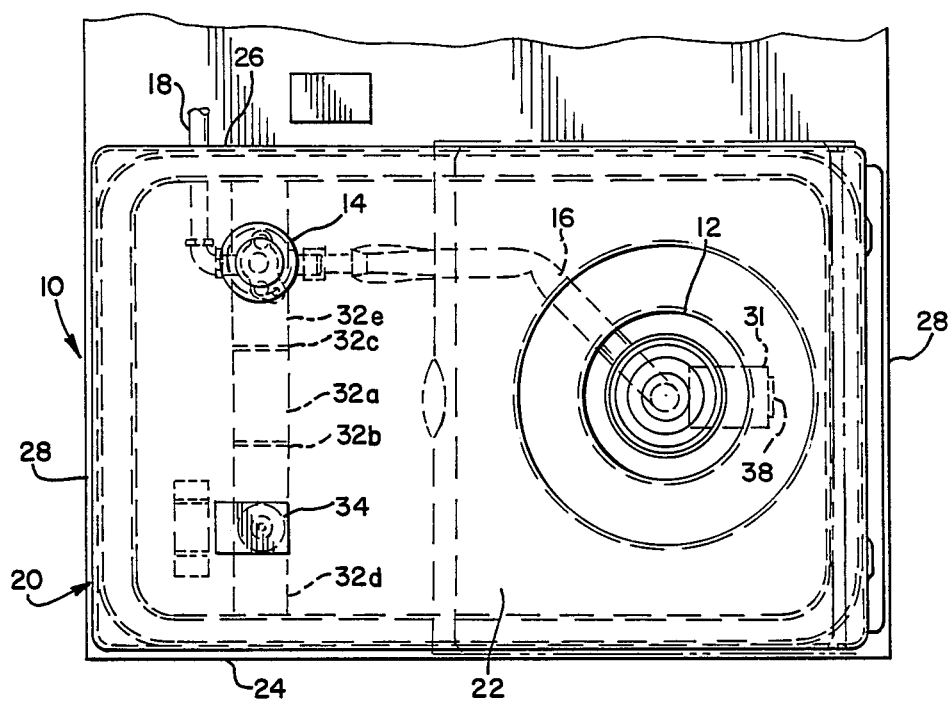
FIG. 1 is a top view of one embodiment of the invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Applicant's invention relates to a burner assembly for a portable gas grill, such as one described in U.S. Pat. No. 4,677,964, assigned to the assignee of the present invention, the specification of which is expressly incorporated herein by reference.

While the burner assembly described herein is utilized in conjunction with a burner unit attached to the side of a portable gas grill to function as a warming tray, such as the burner unit 160 described in the above incorporated patent specification, the scope of the invention is in no way intended to be so limited and includes burner assemblies for any portable gas grill.

Referring to FIG. 1, a burner assembly 10 according to the invention is illustrated. The burner assembly 10 includes a conventional burner 12, a control valve 14, and a rigid pipe 16 coupling the control valve 14 with the burner 12. A flexible pipe or tube 18 couples the control valve 14 to a supply of bottled gas, not shown.

The burner assembly 10 further includes a container or pan 20 having a base surface 22 and first and second opposing side walls 24, 26, respectively. The pan 20 may also include opposing end walls 28. The pan 20 supports a pan cover plate 20a as well as a burner cover plate 20b. The pan cover plate 20a covers the burner assembly 10 within the pan 20. The burner cover plate 20b covers the burner 12 so that a container to be heated can be placed over the burner 12 without direct flame contact.

The flexible pipe 18 transmits gas to the control valve 14, which regulates the flow of the gas via a control knob 29 to the burner 12, as is well known in the art. Openings 30 (FIG. 2) provide ventilation for the burner 12.

A first bracket 31 is secured to the burner 12 and to the base surface 22, as is described in greater detail below. In addition, a second, generally U-shaped bracket 32 is secured to the control valve 14, as well as to the first and second side walls 24, 26. The second bracket also supports an ignitor 34, which is used to ignite the burner 12, as is well known in the art and which is described in greater detail in the above incorporated patent specification.

Figure 2:
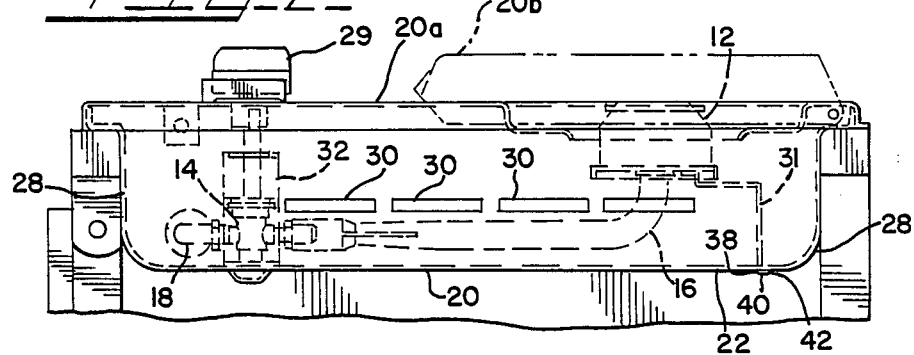
FIG. 2 is a side view of the embodiment disclosed in FIG. 1.

A side view of the burner assembly 10 is illustrated in FIG. 2.

The base surface 22 includes a base slot 38. The first bracket 31 is generally L-shaped and includes a first bracket tab 40 which extends through the base slot 38 and terminates at a horizontal lip 42.

Figure 3:
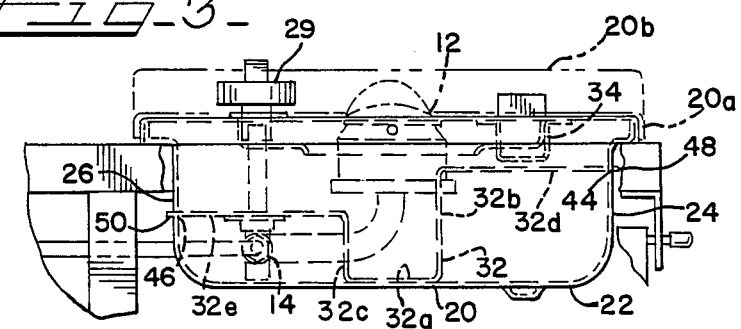
FIG. 3 is an end view of the embodiment disclosed in FIG. 1.

Referring to FIG. 3, the first and second side walls 24, 26 include first and second wall slots 44, 46, respectively. As indicated above, the second bracket 32 is generally U-shaped and includes a support portion 32a resting on the base surface 22 of the pan 20, first and second vertical portions 32b, c and first and second horizontal portions 32d, e, respectively. Extending outwardly from the first and second horizontal portions 32d,e are first and second end tabs 48, 50, respectively, each of which is narrower than its respective first or second horizontal portion 32d or 32e. Each of the first and second wall slots 44, 46 are dimensioned to receive its respective one of the first and second end tabs 48, 50, but is narrower than its respective one of said first and second horizontal portions 32d, e.

Thus, the burner 12, the control valve 14, the rigid pipe 16 coupling the burner 12 and the control valve 14, the first bracket 31 and the second bracket 32 cooperate to form a rigid structure which is securely mounted in the pan 20 by means of the first and second brackets 31, 32.

In order to maintain the tabs 40, 48 and 50 in their respective slots 38, 44, 46, the first bracket 31 and the second bracket 32 are made of a resilient material having spring like properties.

The dimensions among the slots 38, 44, 46 are slightly smaller than the dimensions among the respective tabs 40, 48, 50. Thus, when the tabs 40, 48, 50 are placed in their respective slots 38, 44, 46, the first bracket 31 and the second bracket 32 are slightly, inwardly compressed. This inward compression results in an outwardly directed force on the tabs 40, 48, 50 upon their respective slots 38, 44, 46, securely maintaining the first and second brackets 31, 32 in place. Further when the second bracket 32 is inwardly compressed, the support portion 32a of the second bracket 32 is forced downwardly against the base surface 22 of the pan 20, providing further structural support for the burner assembly 10.

When installing the unit, one first places the first bracket tab 40 into the base slot 38. One then pivotally lowers the second bracket 32 towards the base surface 22, inwardly compressing the first and second end tabs 48, 50 as necessary to insert the respective first and second end tabs 48, 50 into their respective first and second wall slots 44, 46.

Thus, in accordance with the invention, assembly of the burner assembly is quite simple and requires the use of no tools.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed:

1. A burner assembly for an outdoor cooking device comprising:
   a pan including a base surface and opposing, upwardly directed first and second walls, said base surface including a base slot and said first and second walls having respective first and second wall slots;
   a gas burner;
   a gas valve;
   a tube for transmitting gas from said gas valve to said burner;
   a first bracket secured to said burner, said first bracket extending downwardly from said burner and terminating at a first bracket tab;
   a second bracket secured to said valve, said second bracket having generally horizontal first and second end tabs, wherein said first bracket tab is disposed in said base slot and said first and second end tabs are disposed in respective ones of said first and second wall slots.

2. The burner assembly of claim 1 wherein said first bracket tab includes a terminal lip substantially parallel to said base surface.

3. The burner assembly of claim 1 wherein said first bracket is resilient.

4. The burner assembly of claim 1 wherein said second bracket is resilient.

5. The burner assembly of claim 1 including an igniter unit supported by said second bracket.

6. The burner assembly of claim 1 wherein said second bracket is U-shaped.

7. The burner assembly of claim 6 wherein said second bracket is under compression when said first and second end tabs are disposed in said respective ones of said first and second wall slots to maintain said first and second end tabs secured in said respective ones of said first and second wall slots.

8. The burner apparatus of claim 3 wherein said first bracket is under compression when said first bracket tab is disposed in said base slot to maintain said first bracket tab secured in said base slot.

9. The burner apparatus of claim 1 wherein said tube is rigid.

10. The burner apparatus of claim 6 wherein:
    said first bracket is resilient and under compression when said first bracket tab is disposed in said base slot to maintain said first bracket tab secured in said base slot; and
    said second bracket is resilient under compression when said first and second end tabs are disposed in said respective ones of said first and second wall slots to maintain said first and second end tabs secured in said respective ones of said first and second wall slots.

11. A method of assembling a burner assembly for an outdoor cooking device comprising:
    providing a pan having a base surface and opposing first and second walls, said base surface including a base slot and said first and second walls having respective first and second wall slots;
    providing a gas burner and a gas valve,
    providing a gas pipe coupling said gas valve to said burner;
    securing a first bracket to said burner, said first bracket extending downwardly from said burner and terminating at a first bracket tab,
    securing a second bracket to said valve, said second bracket having generally horizontal first and second end tabs
    disposing said first bracket tab in said base slot; and
    disposing said first and second end tabs in respective ones of said first and second wall slots.

12. The method of claim 11 including the step of providing an igniter unit supported by said second bracket.

13. The method of claim 11 wherein said second bracket is U-shaped and including the step of inwardly compressing said first and second end tabs of said second bracket prior to said step of disposing said first and second end tabs in respective ones of said first and second wall slots.

14. The method of claim 11 wherein said first bracket is resilient and including the step of inwardly compressing said first bracket prior to the step disposing said first bracket tab in said base slot.

15. The method of claim 11 wherein said second bracket is U-shaped and including:
   the step of inwardly compressing said first bracket prior to the step disposing said first bracket tab in said base slot; and
   the step of inwardly compressing said first and second end tabs of said second resilient bracket prior to said step of disposing said first and second end tabs in respective ones of said first and second wall slots.

16. A burner assembly for an outdoor cooking device comprising:
   a pan including a base surface and opposing, upwardly directed first and second walls, said base surface including a base slot and said first and second walls having respective first and second wall slots;
   a gas burner;
   a gas valve;
   a rigid tube for transmitting gas from said gas valve to said burner;
   a first bracket secured to said burner, said first bracket extending downwardly from said burner and terminating at a first bracket tab, and
   a second, U-shaped bracket secured to said valve, said second bracket having generally horizontal first and second end tabs, wherein said first bracket tab is disposed in said base slot and said first and second end tabs are disposed in respective ones of said first and second wall slots, wherein dimensions among the base slot and the first and second wall slots relative to dimensions among the first bracket tab and the first and second end tabs maintain the first and second brackets under compression when said tabs are disposed in their respective slots.

* * * * *